United States Patent
Meyer et al.

(10) Patent No.: US 10,447,439 B2
(45) Date of Patent: Oct. 15, 2019

(54) RETRANSMISSION PROTOCOL FEEDBACK HANDLING WITH MULTIPLE FEEDBACK TIMES

(75) Inventors: Michael Meyer, Aachen (DE); Kumar Balachandran, Pleasanton, CA (US); Erik Eriksson, Linköping (SE); Johan Rune, Lidingö (SE); Joachim Sachs, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/380,081

(22) PCT Filed: Feb. 21, 2012

(86) PCT No.: PCT/EP2012/052945
§ 371 (c)(1),
(2), (4) Date: Aug. 21, 2014

(87) PCT Pub. No.: WO2013/123977
PCT Pub. Date: Aug. 29, 2013

(65) Prior Publication Data
US 2015/0016432 A1    Jan. 15, 2015

(51) Int. Cl.
*H04L 1/18*    (2006.01)
(52) U.S. Cl.
CPC .......... *H04L 1/1854* (2013.01); *H04L 1/1812* (2013.01); *H04L 1/1861* (2013.01); *H04L 1/1887* (2013.01); *H04L 1/1896* (2013.01)
(58) Field of Classification Search
CPC .................................................. H04L 1/1854
See application file for complete search history.

(56) References Cited

U.S. PATENT DOCUMENTS

| | | | | |
|---|---|---|---|---|
| 7,039,032 B1 * | 5/2006 | Ho | ........................ | H04W 74/06 340/3.51 |
| 2003/0012166 A1 * | 1/2003 | Benveniste | ........... | H04W 56/00 370/338 |

(Continued)

FOREIGN PATENT DOCUMENTS

| EP | 1052797 A2 | 11/2000 |
|---|---|---|
| EP | 2352249 A2 | 8/2011 |

(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 10)", Technical Specification, 3GPP TS 36.211 V10.2.0, Jun. 1, 2011, pp. 1-103, 3GPP, France.

*Primary Examiner* — John D Blanton
(74) *Attorney, Agent, or Firm* — Coats & Bennett, PLLC

(57) ABSTRACT

In a mobile network, the transmission of downlink data blocks (303, 307) to one or more terminal devices (200, 210) is accomplished on the basis of a retransmission protocol with a first feedback time (F1) defining a time interval between transmission of a first data block (303) and transmission of a first feedback message (308) being different from a second feedback time (F2) defining a time interval between transmission of a second data block (307) and transmission of a second feedback message (309). The first feedback message (308) indicates whether the first data block (303) was successfully received, and the second feedback message (309) indicates whether the second data block (307) was successfully received. A base station (100) of the mobile network controls the terminal device (200, (Continued)

210) to send the second feedback message (309) on other resources than used for transmission of the first feedback message (308).

27 Claims, 9 Drawing Sheets

(56) References Cited

U.S. PATENT DOCUMENTS

| | | | |
|---|---|---|---|
| 2003/0067890 A1 | 4/2003 | Goel et al. | |
| 2009/0046646 A1* | 2/2009 | Cho | H04L 1/1607 370/329 |
| 2009/0175226 A1* | 7/2009 | Ren | H04L 25/0226 370/329 |
| 2009/0241004 A1* | 9/2009 | Ahn | H04L 1/1812 714/749 |
| 2010/0098006 A1* | 4/2010 | Golitschek Edler Von Elbwart | H04L 1/1861 370/329 |
| 2010/0254268 A1* | 10/2010 | Kim | H04W 36/385 370/241 |
| 2011/0090810 A1* | 4/2011 | Park | H04L 1/1854 370/252 |
| 2011/0211522 A1* | 9/2011 | Chung | H04L 1/1822 370/315 |
| 2011/0317653 A1* | 12/2011 | Kwon | H04L 1/1861 370/329 |
| 2012/0002614 A1* | 1/2012 | Ekici | H04W 48/18 370/329 |
| 2012/0078933 A1* | 3/2012 | Kim | H04L 5/0007 707/758 |
| 2012/0287828 A1* | 11/2012 | Chen | H04L 1/1614 370/280 |

FOREIGN PATENT DOCUMENTS

| | | |
|---|---|---|
| WO | 9820511 A1 | 5/1998 |
| WO | 2010101411 A2 | 9/2010 |
| WO | 2010114233 A2 | 10/2010 |

* cited by examiner

RETRANSMISSION PROTOCOL FEEDBACK HANDLING WITH MULTIPLE FEEDBACK TIMES

TECHNICAL FIELD

The present invention relates to methods for controlling retransmission protocol based transmission of data blocks and to corresponding devices.

BACKGROUND

In mobile networks, such as a 3GPP (Third Generation Partnership Project) mobile network, various types of terminal devices may be used. For example, Machine Type Communication (MTC) terminal devices, such as sensor devices, alarm devices, remote control devices, or the like may be used in addition to conventional types of terminal devices, such as mobile phones, smartphones, data modems, mobile computers, or other types of user equipment (UE). MTC terminal devices are typically characterized by a modest bit rate and sparse communication. MTC terminal devices may therefore be implemented with low-performance communication capabilities.

The existence of MTC terminal devices or other devices having similar data traffic characteristics may have an impact on the mobile network, in particular if the mobile network is designed to support large bandwidths or high throughputs, as for example in a mobile network according to 3GPP LTE (Long Term Evolution).

According to the Release 8/9 versions of the LTE specifications, the supported cell bandwidth is within the range of 6 and 100 resource blocks (RBs), about 1.4 to 20 MHz, and a UE is mandated to support all specified bandwidths in order to be standard compliant. Furthermore, UEs belonging to the lowest defined release 8/9 UE category need to support bit rates of at least 10 Mbit/s in the downlink and 5 Mbit/s in the uplink, which exceeds the needs of most MTC terminal devices. The ability to support high bandwidth, in particular bandwidth flexibility, and high throughput drives both cost and power consumption in the MTC terminal device. Accordingly, it is desirable to define low-performance UE categories in order to meet the characteristics of MTC terminals devices.

With the introduction of low-performance UE categories, it is possible to manufacture terminal devices with considerably less complexity and/or power consumption. In particular, the cost of each device is to a large extent driven by the silicon area. With significantly reduced throughput requirements, it is possible to reduce the size of hardware accelerators that are used to perform the most computationally complex operations, or even to replace them altogether with software implementations. Similarly, in a software-based implementation it is possible to replace large, possibly multiple, processors with smaller and/or fewer ones.

The potential to reduce the power consumption in a terminal device also strongly depends on the supported bitrates. Given a specific UE implementation, operation at the maximum supported bitrate requires a certain number of baseband processing operations, corresponding to a certain power consumption. Lower bitrates than the maximum one require fewer baseband processing operations, whether implemented in hardware or software. Consequently, support of lower bitrates may also be used for enabling reduction of energy consumption by the terminal device.

Even though it is possible to lower device complexity and/or power consumption when the throughput requirements are lower, there are typically still some timing constraints that need to be fulfilled in order to comply with a particular mobile network standard. For example, in 3GPP LTE one such timing constraint is associated with feedback messages of a Hybrid Automatic Repeat Request (HARQ) protocol which is used for reporting whether a transmission on the physical layer could be successfully decoded by the UE or not.

More specifically, in 3GPP LTE a synchronous HARQ feedback timing is used. For a downlink transmission this means that when a transmission of a transport block takes place the HARQ feedback message is sent by the UE after a fixed feedback time. Both, fixed timing as well as the specific resource allocation provides that no additional information is needed to map the HARQ feedback message to the corresponding terminal and the HARQ process it belongs to.

The resource allocation for the Physical Uplink Control Channel (PUCCH) is done via a predefined fixed mapping to the resources that are used on the Physical Downlink Control Channel (PDCCH) for sending a downlink assignment. The resources used on the PDCCH are called Control Channel Element (CCE). The first used CCE for the downlink assignment determines which PUCCH resource should be used for the HARQ feedback.

However, the above way of controlling HARQ feedback timing may be problematic when different types of terminal devices coexist in the mobile network, e.g., MTC terminal devices and conventional UEs. In particular, low-performance terminal devices may not be able to comply with the HARQ timing requirements in the same way as conventional UEs. Also, the HARQ timing requirements may be problematic for a UE which is in a low power mode.

Accordingly, there is a need for techniques which allow for efficiently handling feedback of a retransmission protocol used for transmissions of data blocks between a mobile network and a terminal device.

SUMMARY

According to an embodiment of the invention, a method of controlling transmission of data blocks between a mobile network and at least one terminal device is provided. The transmission of the data blocks is accomplished on the basis of a retransmission protocol with a first feedback time, defining a time interval between transmission of a first data block and transmission of a first feedback message, being different from a second feedback time, defining a time interval between transmission of a second data block and transmission of a second feedback message. The first feedback message indicates whether the first data block was successfully received, and the second feedback message indicates whether the second data block was successfully received. According to the method, a base station of the mobile network controls the terminal device to send the second feedback message on other resources than the first feedback message.

According to a further embodiment of the invention, a method of controlling transmission of data blocks between a mobile network and a terminal device is provided. The transmission of the data blocks is accomplished on the basis of a retransmission protocol with a first feedback time, defining a time interval between transmission of a first data block and transmission of a first feedback message, being different from a second feedback time, defining a time interval between transmission of a second data block and transmission of a second feedback message. The first feedback message indicates whether the first data block was successfully received, and the second feedback message indicates whether the second data block was successfully received. According to the method, the terminal device receives control data from a base station of the mobile network. In accordance with the received control data, the terminal device sends the second feedback message on other resources than the first feedback message.

According to a further embodiment of the invention, a base station for use in a mobile network is provided. The base station comprises a radio interface for transmission of data blocks with respect to at least one terminal device. Further, the base station comprises a processor. The processor is configured to control the transmission of data blocks on the basis of a retransmission protocol with a first feedback time, defining a time interval between transmission of a first data block and transmission of a first feedback message, being different from a second feedback time, defining a time interval between transmission of a second data block and transmission of a second feedback message. The first feedback message indicates whether the first data block was successfully received, and the second feedback message indicates whether the second data block was successfully received. Further, the processor is configured to control the terminal device to send the second feedback message on other resources than the first feedback message.

According to a further embodiment of the invention, a terminal device is provided. The terminal device comprises a radio interface for transmission of data blocks with respect to a mobile network. Further, the terminal device comprises a processor. The processor is configured to control the transmission of data blocks on the basis of a retransmission protocol with a first feedback time, defining a time interval between transmission of a first data block and transmission of a first feedback message, being different from a second feedback time, defining a time interval between transmission of a second data block and transmission of a second feedback message. The first feedback message indicates whether the first data block was successfully received, and the second feedback message indicates whether the second data block was successfully received. Further, the processor is configured to receive control data from a base station of the mobile network and to control, in accordance with the received control data, the terminal device to send the second feedback message on other resources than the first feedback message.

According to a further embodiment of the invention, a computer program product is provided, e.g., in the form of a physical storage medium. The computer program product comprises program code to be executed by a processor of a base station of a mobile network. By executing the program code, the processor is configured to control the transmission of data blocks between the base station and a terminal device. The transmission of the data blocks is accomplished on the basis of a retransmission protocol with a first feedback time, defining a time interval between transmission of a first data block and transmission of a first feedback message, being different from a second feedback time, defining a time interval between transmission of a second data block and transmission of a second feedback message. The first feedback message indicates whether the first data block was successfully received, and the second feedback message indicates whether the second data block was successfully received. By executing the program code, the processor is further configured to control the terminal device to send the second feedback message on other resources than the first feedback message.

According to a further embodiment of the invention, a computer program product is provided, e.g., in the form of a physical storage medium. The computer program product comprises program code to be executed by a processor of a terminal device. By executing the program code, the processor is configured to control the transmission of data blocks between a mobile network and the terminal device. The transmission of the data blocks is accomplished on the basis of a retransmission protocol with a first feedback time, defining a time interval between transmission of a first data block and transmission of a first feedback message, being different from a second feedback time, defining a time interval between transmission of a second data block and transmission of a second feedback message. The first feedback message indicates whether the first data block was successfully received, and the second feedback message indicates whether the second data block was successfully received. By executing the program code, the processor is further configured to receive control data from a base station of the mobile network and to control the terminal device to send the second feedback message on other resources than the first feedback message.

DETAILED DESCRIPTION OF EMBODIMENTS

In the following, the invention will be explained in more detail by referring to exemplary embodiments and to the accompanying drawings. The illustrated embodiments relate to concepts involving retransmission protocol based transmission of data blocks between a base station of a mobile network and a terminal device.

Figure 1:
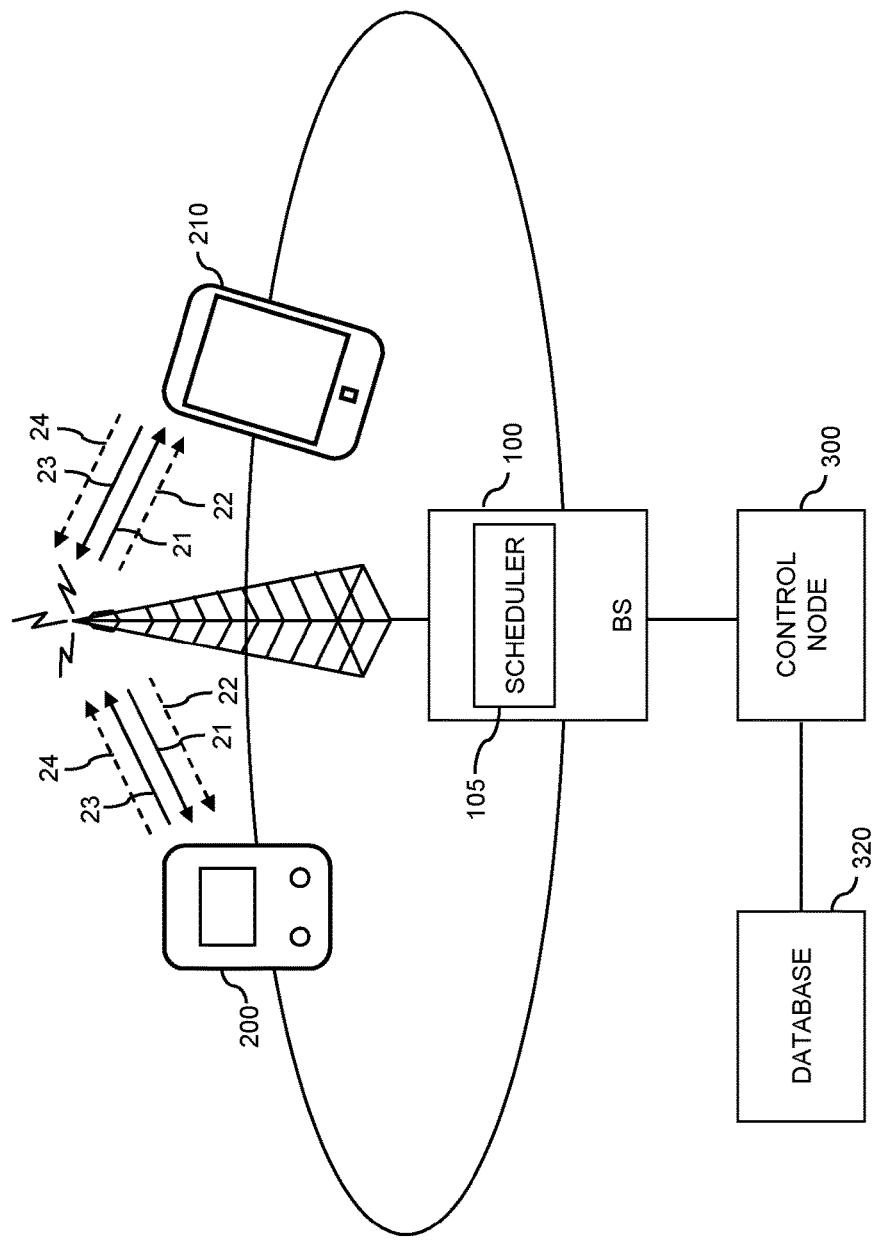
FIG. 1 schematically illustrates a mobile network environment in which concepts according to embodiments of the invention can be applied.

FIG. 1 schematically illustrates a mobile network environment, i.e., infrastructure of a mobile network, represented by a base station (BS) 100, a control node 300 and a database 320, as well as a first terminal device 200 and a second terminal device 210 which may connect to the mobile network for transmission of user data, e.g., for reception of downlink user data from the BS 100 on a downlink data channel 21, and/or for sending of uplink user data to the BS 100 on an uplink data channel 23. In the following, it will be assumed that the mobile network is implemented according to 3GPP LTE. Accordingly, the BS 100 may be an evolved Node B (eNB), and the control node 300 may be a Mobility Management Entity (MME). The downlink data channel may be a Physical Downlink Shared Channel (PDSCH), and the uplink data channel may be a Physical Uplink Shared Channel (PUSCH). The transmission of downlink user data is accomplished using Orthogonal Frequency Division Multiple Access (OFDMA), and the transmission of uplink user data is accomplished using Single Carrier Frequency Division Multiple Access (SC-FDMA). The database 320 may for example be implemented by a Home Subscriber Server (HSS).

The transmission of user data may occur in the form of data blocks having a certain size and using a retransmission protocol. In accordance with the LTE terminology, the data blocks will herein also be referred to as transport blocks. In some scenarios, different sizes of data blocks can be supported by the mobile network, which means that the data block size can vary from one data block to the other or between different terminal devices. The retransmission protocol involves sending a feedback message indicating whether a data block was successfully received or not. A feedback message indicating that the data block was successfully received is also referred to as ACK ("acknowledgement"), and a feedback message indicating that the data block was not successfully received is also referred to as NACK ("negative acknowledgement"). Successful reception may be defined by successful physical layer decoding. In accordance with the illustrated LTE scenario, the retransmission protocol may be a HARQ protocol.

The BS 100 controls the transmission of the data blocks to or from the terminal devices 200, 210 by means of control channels 22, 24. For this purpose, a downlink control channel 22 is provided from the BS 100 to the terminal devices 200, 210, and an uplink control channel 24 is provided from the terminal devices 200, 210 to the BS 100. The downlink control 22 channel may be the PDCCH, and the uplink control channel 24 may be the PUCCH. Controlling of the transmissions by the BS 100 may specifically involve scheduling of the transmissions, e.g., by determining time resources, frequency resources, transmission power, modulation scheme, or coding scheme to be used for a particular uplink or downlink transmission. Corresponding scheduling information may be transmitted from the BS 100 to the terminal devices 200, 210 using the downlink control channel 22. For performing the scheduling, the BS 100 is implemented with a scheduler 105. The uplink control channel may 24 in turn be used for sending feedback messages of the retransmission protocol from the terminal devices 200, 210 to the BS 100.

In the illustrated example, it is assumed that the first terminal device 200 has lower processing capabilities than the second terminal device 210. For example, the second terminal device 210 may be a mobile phone, portable computer, or other type of UE, whereas the first terminal device 200 is a MTC terminal device, a low-cost UE, or a UE operated in a low-power mode. For example, the first terminal device 200 may have a lower amount of soft buffer for decoding of received transmissions or a lower processing performance than the second terminal device 210. Also, the first terminal device 200 may have other retransmission protocol capabilities than the second terminal device 200. More specifically, a feedback time of the HARQ protocol used by the first terminal device 200 may be larger than a feedback time of the HARQ protocol used by the second terminal device 210. In this connection, the feedback time is defined as a time interval between transmission of a data block and transmission of a feedback message, e.g., a HARQ ACK or HARQ NACK, indicating whether the data block was successfully received by the terminal device 200, 210. Further, the number of retransmissions allowed for the first terminal device 200 may be lower than for the second terminal device 210. Further, the number of HARQ processes which are allowed in parallel could be lower for the first terminal device 200 than for the second terminal device 210. For example, the first terminal device 200 could allow only one HARQ process in parallel.

By allowing different feedback times of the HARQ protocol, the requirements on the processing capabilities of the first terminal device 200 may be relaxed. In particular, the first terminal device 200 does not need to provide the feedback message in the shorter feedback time as used by the second terminal device 210 and therefore can be implemented with a lower processing performance.

The concepts as described herein may be used for efficiently dealing with different feedback times of terminal devices as for example the first and second terminal devices 200, 210. In particular, collisions of feedback messages due to different underlying feedback times may be avoided.

Figure 2:
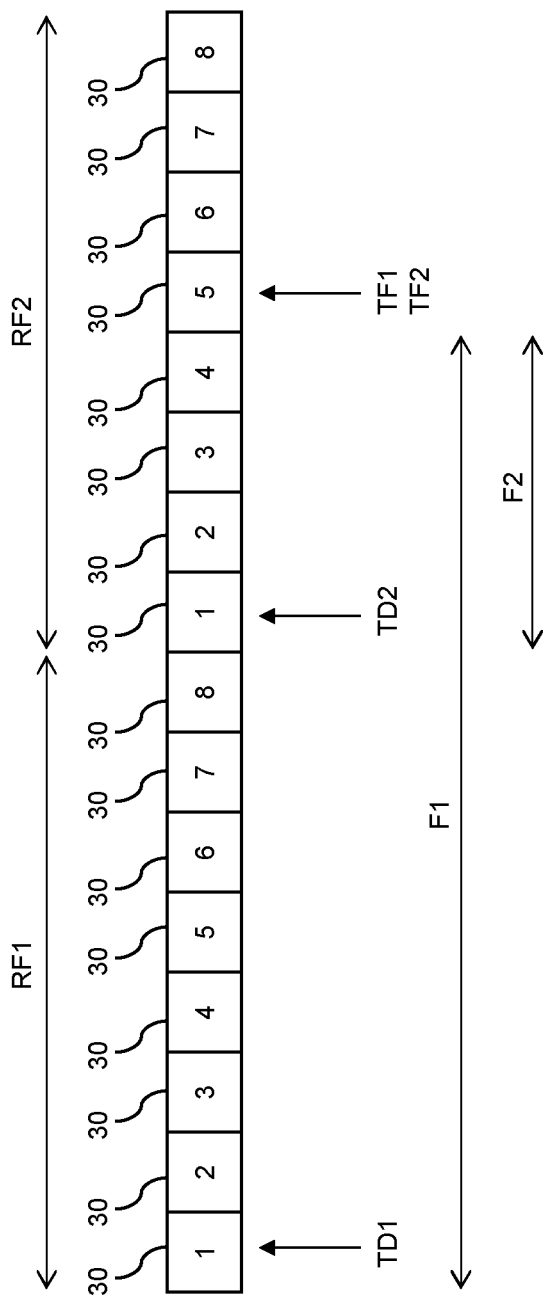
FIG. 2 shows an exemplary feedback collision scenario which may be handled using concepts according to embodiments of the invention.

FIG. 2 schematically illustrates an exemplary feedback collision scenario which may occur to different HARQ feedback times. In particular, FIG. 2 shows a sequence of a first radio frame (RF1) and of a second radio frame (RF2) transmitted by the BS 100. Each of the radio frames includes subframes 30, numbered from 1 to 8, in which the downlink transmission of data blocks to terminal devices can be scheduled. In the illustrated example, it is assumed that a first transmission of a downlink data block to a first terminal device, e.g., the terminal device 200, is scheduled in subframe 1 of the first radio frame, as indicated by the vertical arrow TD1. The first terminal device is assumed to use a feedback time of 12 ms, corresponding to the duration of 12 subframes. Further, it is assumed that a second transmission of a downlink data block to a second terminal device, e.g., the terminal device 210, is scheduled in subframe 1 of the second radio frame, as indicated by the vertical arrow TD2. The second terminal device is assumed to use a feedback time of 4 ms, corresponding to the duration of 4 subframes. As indicated by the vertical arrow TF1, TF2, the feedback messages from both terminal devices would then be transmitted in subframe 5 of the second radio frame, giving rise to a potential feedback collision. In case of a feedback collision, the BS 100 might not be able to detect the signals transmitting the feedback messages correctly or might not be able to correctly determine the downlink data block to which the feedback message relates. The concepts as described herein aim at avoiding such feedback collisions.

In a similar fashion as illustrated in FIG. 2, variations of the feedback time of the same terminal device may result in a potential feedback collision. Such variations may for example be due to the terminal device entering or leaving a low-power mode associated with a different feedback time.

According to the concepts described herein, the base station 100 controls at least one of the terminal devices 200, 210, in such a way that feedback messages corresponding to different feedback times are sent on different resources. For example, the feedback messages may be sent on different resources of the uplink control channel 24, i.e., using different time and/or frequency resources of the uplink control channel 24. Further, the feedback messages may be sent on the same time and/or frequency resources of the uplink control channel, but using different codes. Further, one feedback message could be sent on the uplink data channel 21 in order to avoid a collision with another feedback message on the uplink control channel 22. Further, different resource areas of the uplink control channel 24 could be assigned to different values of the feedback time, and these different resource areas could be orthogonal to each other. For example, the different resource areas could be separated from each other in the time domain, in the frequency domain, and/or in the code domain. The BS 100 may become aware of the feedback time of a terminal device by receiving corresponding uplink control data from the terminal device. For example, such uplink control data could explicitly indicate the feedback time used by the terminal device or could indicate a device category of the terminal device, which is in turn mapped to a corresponding value of the feedback time. The uplink control data could also indicate a device identifier, e.g., in the form of an International Mobile Equipment Identifier (IMEI), which in turn can be mapped to the feedback time or to a device category associated with a certain feedback time. Corresponding mapping data can be stored in the database 320.

Controlling the terminal device 200, 210 to use certain resources for sending the feedback message may for example be accomplished by sending corresponding downlink control data to the terminal device 200, 210. For example, the downlink control data could include scheduling information for sending a data block, and a CCE of the downlink control channel 22 for transmission of the scheduling information could be assigned to in such a way that transmission of the feedback message corresponding to the data block occurs on a certain resource block of the uplink control channel 24. The downlink control data could also explicitly indicate an assignment of resources of the uplink control channel 24 or of the uplink data channel 23 for transmission of the feedback message, e.g., using a corresponding Downlink Control Information (DCI) format. Further, the downlink control data could indicate the resource area to be used for sending the feedback message. In some scenarios, sending the downlink control data may be accomplished in response to detecting a potential collision between two feedback messages, thereby avoiding unnecessary control interaction in situations in which there is no risk of a collision between feedback messages. For this purpose, the base station 100 may keep track of ongoing HARQ processes of the terminal devices 200, 210 so as to be able to assess on which resources of the uplink control channel 24 a feedback message can be expected.

Figure 3:
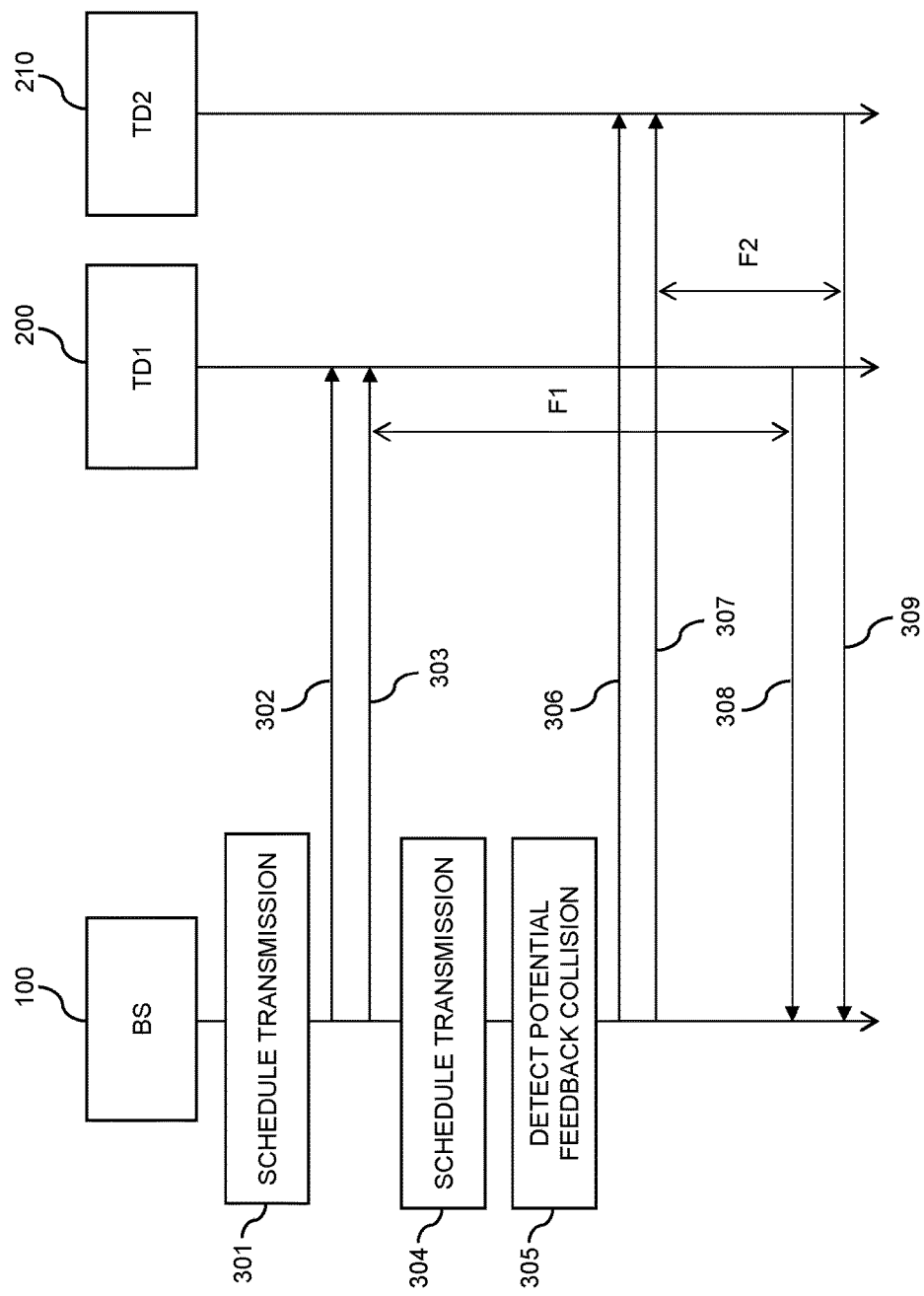
FIG. 3 shows a signaling diagram for schematically illustrating exemplary procedures according to an embodiment of the invention.

In the following, the concepts will be explained in more detail by referring to an exemplary scenario involving transmissions of downlink transport blocks 303, 307 to two terminal devices using different feedback times. As indicated by the reference numerals, these terminal devices may correspond to the terminal devices 200 and 210 of FIG. 1. FIG. 3 shows a signaling diagram for illustrating exemplary procedures to be applied in such a scenario.

The procedures of FIG. 3 involve the BS 100, the first terminal device 200 and the second terminal device 210. The first terminal device 200 uses a first feedback time F1 which is larger than a second feedback time F2 used by the second terminal device 210. The BS 100 is responsible for controlling transmissions of the transport blocks 303, 307 to the terminal devices 200 and 210, in particular for scheduling such transmissions.

At step 301, the BS 100 schedules transmission of the first transport block 303 to the first terminal device 200. This may involve determining a resource block of the downlink data channel 21 for sending the first transport block 303. By message 302, the BS 100 sends downlink control data including corresponding scheduling information to the first terminal device 200. This scheduling information may also be referred to as a downlink assignment. From the received scheduling information, the first terminal device 200 knows which resource blocks of the downlink data channel 21 it should monitor in order to receive the first transport block 303. In accordance with the scheduling information as determined at step 301, the BS 100 then sends the first transport block 303. Transmission of a first feedback message 308 from the first terminal device 200 can then be expected a time interval F1 after transmission of the first transport block 303. Although message 302 and the transport block 303 are illustrated separately, they may actually be transmitted substantially at the same time.

At step 304, the BS 100 schedules transmission of the second transport block 307 to the second terminal device 210. This may involve determining a resource block of the downlink data channel 21 for sending the second transport block 307. Further, at step 305, the BS 100 detects whether there is a potential collision between the first feedback message 308 and a second feedback message 309 transmitted by the second terminal device 210 in response to the second transport block 307.

If a potential collision is detected at step 305, the BS 100 may send a message 306 with downlink control data for controlling the terminal device 210 to send the second feedback message 309 on other resources than expected to be used for the first feedback message 308. For example, the control data may use an appropriately selected CCE of the downlink control channel 22 to steer transmission of the second feedback message 309 to available resources of the uplink control channel 24. The control data may also explicitly indicate available resources of the uplink control channel 24 to be used for transmission of the second feedback message 309, e.g., in terms of an resource block index or in terms of an offset. For this purpose, a corresponding DCI format may be used on the downlink control channel 22. In response to detecting a potential collision at step 305, the BS 100 may also alter the scheduling information determined at step 304, e.g., by delaying the scheduled transmission of the second transport block 307.

The message 306 may also include scheduling information corresponding to the scheduling of step 304, optionally as altered in step 305. That is to say, the message 306 may also convey a downlink assignment for transmission of the second transport block 307. From the received scheduling information, the second terminal device 210 knows which resource blocks of the downlink data channel 21 it should monitor in order to receive the second transport block 307. In accordance with the scheduling information as determined at step 304, and optionally as altered at step 305, the BS 100 then sends the second transport block 307. From the received downlink control data, the second terminal device 210 also knows on which resources the second feedback message 309 should be sent, e.g., which resources of the uplink control channel 24 should be used for sending the second feedback message 309.

After expiry of the first feedback time F1, the first terminal device 200 sends the first feedback message 308. After expiry of the second feedback time F2, the second terminal device 210 sends the second feedback message 309 on resources as determined by the BS 100 to avoid collision with the first feedback message 308.

Figure 4:
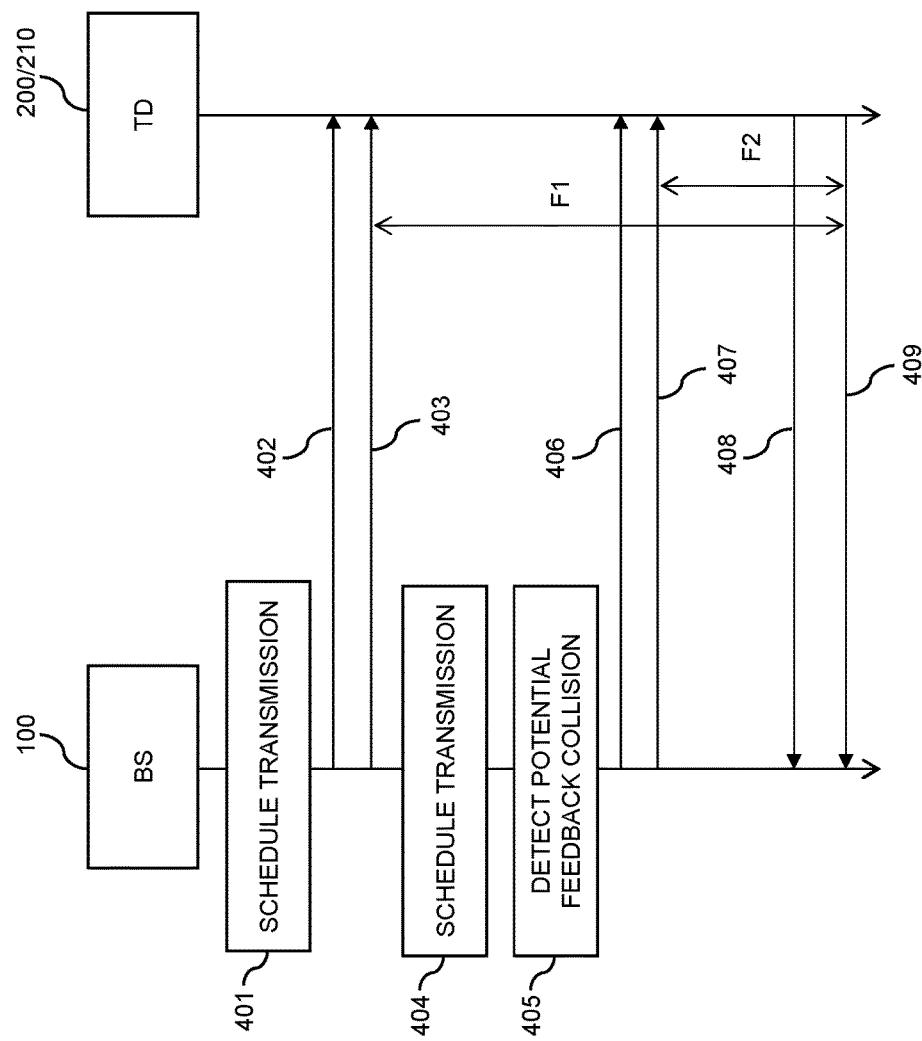
FIG. 4 shows a signaling diagram for schematically illustrating further exemplary procedures according to an embodiment of the invention.

In some scenarios, different feedback times may also be used by the same terminal device, e.g., due to the feedback time being adjusted depending on the size of the transport block or due to the terminal device entering or leaving a low power mode associated with a different feedback time. In the following such a scenario will be further explained in an implementation involving transmissions of two downlink transport blocks 403, 407 to one terminal device 200/210 using different feedback times. As indicated by the reference numerals, the terminal device 200/210 may correspond either to the above-mentioned first terminal device 200 or second terminal device 210. FIG. 4 shows a signaling diagram for illustrating exemplary procedures to be applied in such a scenario.

The procedures of FIG. 4 involve the BS 100 and the terminal device 200/210 and the second terminal device 210. The terminal device 200/210 uses a variable feedback time. That is to say, for the first downlink transport block 403, the terminal device 200/210 uses a feedback time F1 which is larger than a second feedback time F2 used for the second downlink transport block 407. In this way, for example a larger size of the first transport block 403 or operation of the terminal device 200/210 in a low power mode when receiving the first transport block 403 can be taken into account. The BS 100 is responsible for controlling transmissions of the transport blocks 403, 407 to the terminal device 200/210, in particular for scheduling such transmissions.

At step 401, the BS 100 schedules transmission of the first transport block 403 to the terminal device 200/210. This may involve determining a resource block of the downlink data channel 21 for sending the first transport block 403. By message 402, the BS 100 sends control data including corresponding scheduling information, i.e., a downlink assignment for transmission of the first transport block 403, to the terminal device 200/210. From the received scheduling information, the terminal device 200/210 knows which resource blocks of the downlink data channel 21 it should monitor in order to receive the first transport block 403. In accordance with the scheduling information as determined at step 401, the BS 100 then sends the transport block 403. Transmission of a first feedback message 408 from the terminal device 200/210 can then be expected a time interval F1 after transmission of the first transport block 403. Although message 402 and the transport block 403 are illustrated separately, they may actually be transmitted substantially at the same time.

At step 404, the BS 100 schedules transmission of the second transport block 407 to the terminal device 200/210. This may involve determining a resource block of the downlink data channel 21 for sending the second transport block 407. Further, at step 405, the BS 100 detects whether there is a potential collision between the first feedback message 408 and a second feedback message corresponding to the second transport block 407.

If a potential collision is detected at step 405, the BS 100 may send a message 406 with downlink control data for controlling the terminal device 200/210 to send the second feedback message 409 on other resources than expected to be used for the first feedback message 408. For example, the control data may be defined by using an appropriately selected CCE of the downlink control channel 22 to steer transmission of the second feedback message 409 to available resources of the uplink control channel 24. The control data may also explicitly indicate available resources of the uplink control channel 24 to be used for transmission of the second feedback message 409, e.g., in terms of an resource block index or in terms of an offset. For this purpose, a corresponding DCI format may be used on the downlink control channel 22. In response to detecting a potential collision at step 405, the BS 100 may also alter the scheduling information determined at step 404, e.g., by delaying the scheduled transmission of the second transport block 407.

The message 406 may also include scheduling information corresponding to the scheduling of step 404, optionally as altered in step 405. That is to say, the message 406 may also convey a downlink assignment for transmission of the second transport block 407. From the received scheduling information, the terminal device 200/210 knows which resource blocks of the downlink data channel 21 it should monitor in order to receive the second transport block 407. In accordance with the scheduling information as determined at step 404, and optionally as altered at step 405, the BS 100 then sends the second transport block 407. From the received downlink control data, the terminal device 200/210 also knows on which resources the second feedback message 409 should be sent, e.g., which resources of the uplink control channel 24 should be used for sending the second feedback message 409.

After expiry of the first feedback time F1, the terminal device 200/210 sends the first feedback message 408. After expiry of the second feedback time F2, the terminal device 200/210 sends the second feedback message 409 on resources as determined by the BS 100 to avoid collision with the first feedback message.

In FIGS. 3 and 4, the first feedback message 308, 408 and the second feedback message 309, 409 are illustrated to be transmitted at different times, i.e., a collision is avoided by separating the resources for transmitting the first and second feedback messages in the time domain. However, it is to be understood that resources for transmission of the first feedback message 308, 408 and the second feedback message 309, 409 could alternatively or in addition be separated in the frequency domain and/or in the code domain.

In some scenarios, the second feedback message 309, 409 may also be transmitted on the uplink data channel 23 in order to avoid a collision with the first feedback message 308, 408 on the uplink control channel 24. In this case, the control data of message 306, 406 may include a corresponding assignment of a resource block of the uplink data channel 23.

Sending the second feedback message 309, 409 on the uplink data channel 23 may also be used as a fallback option if it is not possible to find a resource block for sending the second message on the uplink control channel 24.

In some scenarios, if the feedback time used by the terminal device 200/210 is variably adjusted, e.g., depending on the size of the transport block, the terminal device 200/210 may use a feedback resource shift $\Delta F$ which depends on the on the adjusted feedback time. In such a way, for example usage of control signaling from the BS 100 to the terminal device 200/210 can be implemented in an efficient manner. The feedback resource shift $\Delta F$ may be preconfigured in the terminal device 200/210 or signaled to the terminal device 200/210 using higher layer signaling, e.g., using signaling on the basis of a Radio Resource Control (RRC) protocol or on the basis of a Medium Access Control (MAC) protocol. In such implementations, the terminal device 200/210 may calculate an index n of the resource block of the uplink control channel 24 to be used for sending the second feedback message 309/409 according to:

$$n = n_{CCE} + \Delta F + N, \tag{1}$$

where $n_{CCE}$ is an index of the CCE on the downlink control channel 22 used for sending the downlink assignment, and N is a static offset, e.g., as configured by higher layer signaling.

Alternatively, the index n could be calculated according to:

$$n = \mathrm{mod}(n_{CCE} + \Delta F, N_F) + N, \qquad (2)$$

where $N_F$ is the size of a resource area of the uplink control channel provided for sending feedback messages, e.g., as configured by higher layer signaling.

Exemplary values of the feedback resource shift $\Delta F$ to be used in Equation (1) or (2) could be $\Delta F=0$ for a feedback time of 4 ms and $\Delta F=3$ for a feedback time different from 4 ms, but also other values and/or differentiation between more than two feedback times could be considered.

Figure 5:
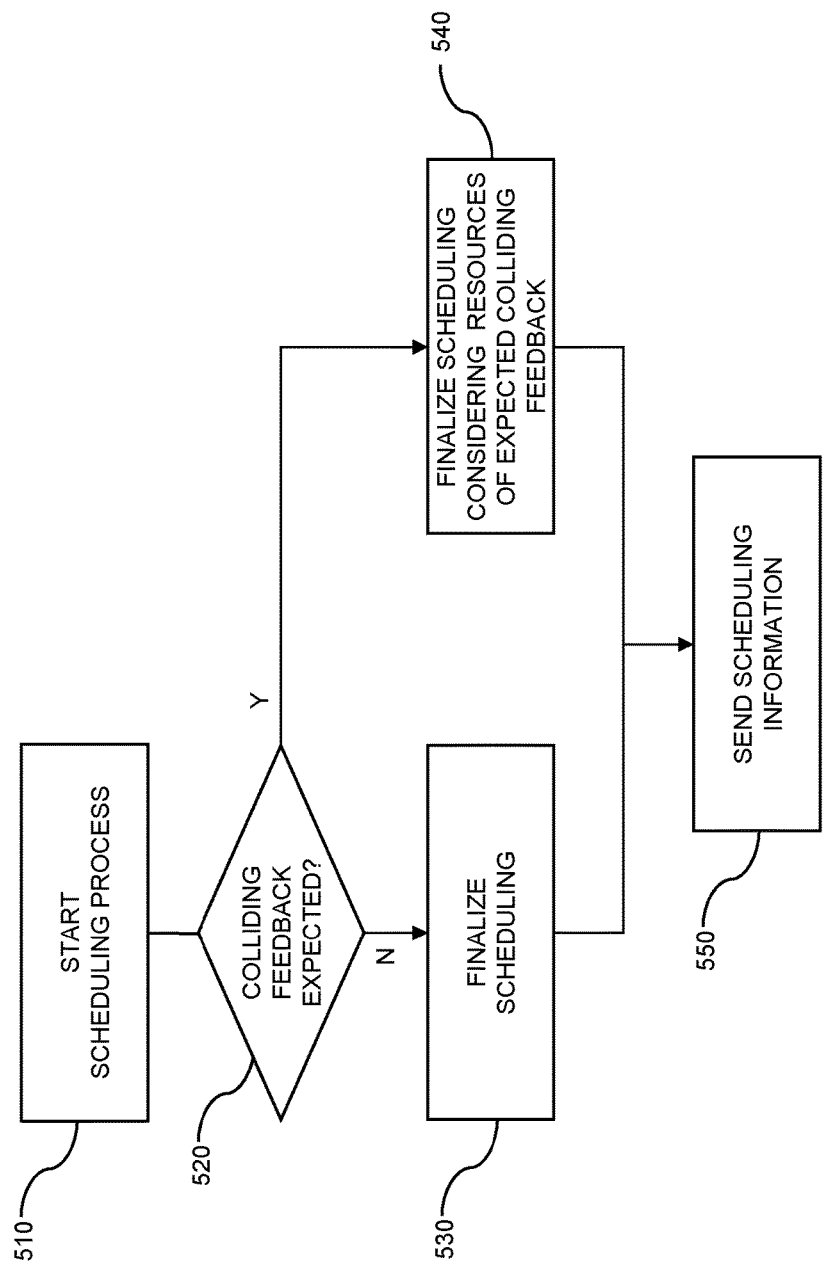
FIG. 5 shows a flowchart for illustrating an exemplary scheduling process according to an embodiment of the invention.

FIG. 5 shows a flowchart for illustrating an exemplary scheduling process which may be used to implement steps 304 and 305 of FIG. 3 or steps 404 or 405 of FIG. 4. The method may be implemented by the BS 100, e.g., by the scheduler 105.

At step 510, the scheduling process starts. Here, an initial determination of resource blocks to be used for transmission of the second transport block may take place. From this initial determination and the feedback time used by the terminal device 200/210, the BS 100 can determine on which resource block of the uplink control channel the second feedback message 309, 409 can be expected.

At step 520, the BS 100 determines whether another feedback message is expected on the same resources as expected to be used for the second feedback message 309, 409, i.e., whether there is a potential feedback collision. For example, the first feedback message 308, 408 could be expected on the same resources as the second feedback message 309, 409. If there is no potential feedback collision, as indicated by branch "N", the method continues with step 530.

At step 530, scheduling is finalized, e.g., by selecting a CCE of the downlink control channel 22 in a conventional manner, and at step 550 the BS 100 sends the determined scheduling information to the terminal device 200/210.

If the determination of step 520 reveals that there is a potential feedback collision, the method continues with step 540, as indicated by branch "Y". At step 540, scheduling is finalized taking into account the resources of the conflicting feedback message. In particular, downlink control data may be determined for controlling the terminal device 200/210 to send the second feedback message 309, 409 on other resources than the conflicting feedback message. For example, a CCE of the downlink control channel 22 may be selected so as to steer the second feedback message 309, 409 to available resources of the uplink control channel 24, i.e., resources on which no other feedback messages are expected. Alternatively, the downlink control data could be determined to explicitly indicate the available resources of the uplink control channel 24, e.g., in terms of an resource block index or an offset. The downlink control data could also be determined to indicate a resource block of the uplink data channel 23 to be used for transmission of the second feedback message 309, 409.

From step 540, the method proceeds to step 550, where the determined scheduling information and control data are sent to the terminal device 200/210.

In some scenarios, transmission of the second feedback message 309, 409 on other resources than the first feedback 308, 408 message may also be achieved by assigning corresponding resource areas, e.g., predefined groups of resource blocks, of the uplink control channel 24 to the different feedback times, the different resource areas being orthogonal to each other. In this way, the first feedback message 308, 408 could be transmitted in a first resource area corresponding to the first feedback time F1, and the second feedback message could be transmitted in a second resource area corresponding to the second feedback time F2. In this case, the detection of potential collisions and sending of control data for individual transport blocks for determining the resources to be used for the feedback messages in steps 305 and 405 could be omitted. Rather, the resource area to could be signaled to the terminal device 200/210 once the feedback time used by the terminal device is known. Within each resource area, conventional mapping on the basis of the CCE could be used for determining the resource block for transmission of the feedback message. The resource areas may be separated from each other in the time domain, in the frequency domain, and/or in the code domain.

A separation in the code domain could be implemented by using a corresponding PUCCH Format. Such PUCCH Format could use Binary Phase Shift Keying (BPSK) or Quadrature Phase Shift Keying (QPSK) as modulation scheme respectively and communicate either 1 or 2 bits of information, the bits to be communicated resulting in a complex valued sequence that is formed by a cyclically shifted sequence of length 12, and covered by one of three orthogonal sequences, which differ based on whether a normal or extended cyclic prefix is used. In such a PUCCH Format, the total number of sequences that are available for PUCCH transmission would be 12×3=36 in total. This sequence space may be divided between different feedback times to obtain the different resource areas. In some scenarios, an existing PUCCH format, e.g., the PUCCH Format 1a, 1b, or 3 defined in 3GPP Technical Specification 36.211, could be reused for this purpose, by assigning unused sequences to a certain feedback delay.

On the basis of a device category of the terminal device 200/210, the terminal device 200/210 could be identified as using a certain feedback time and be assigned to use the corresponding resource area.

Figure 6:
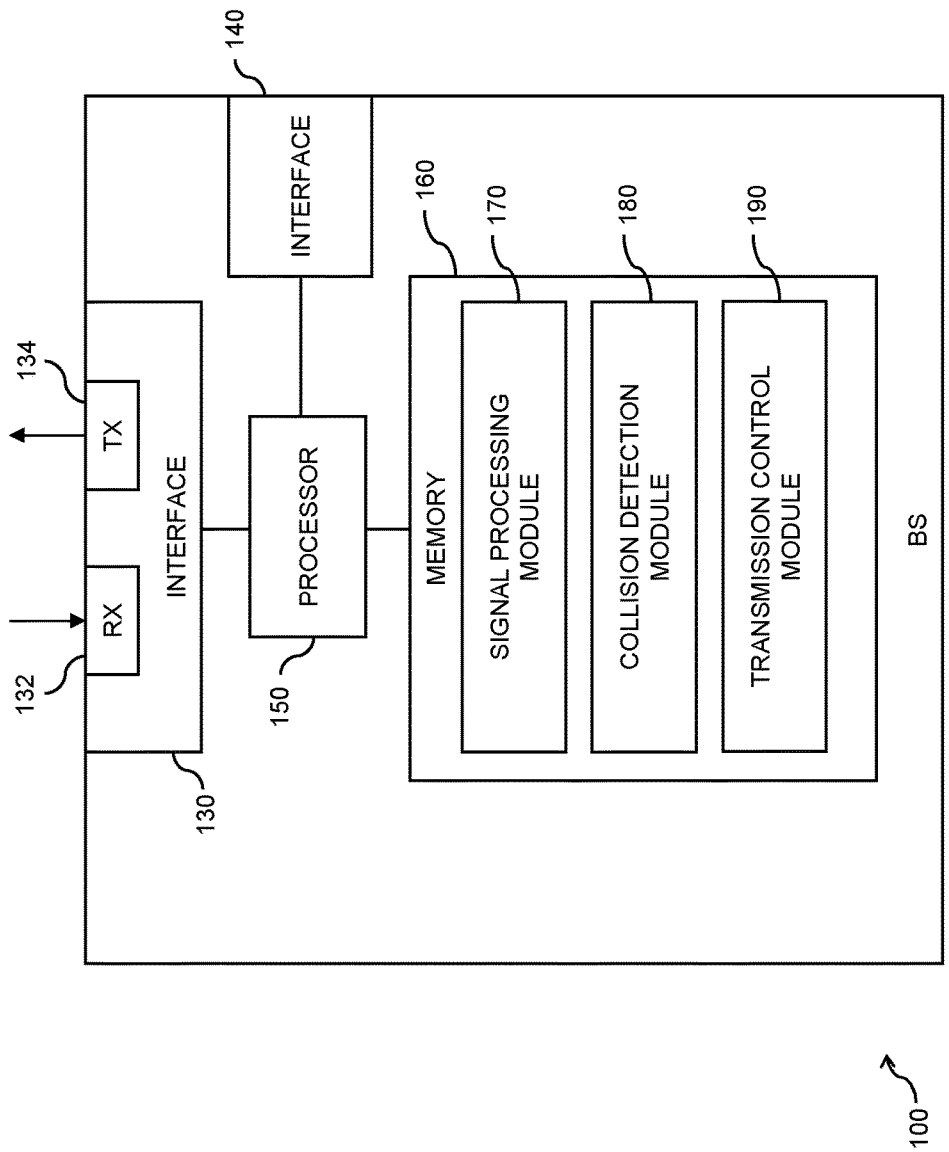
FIG. 6 schematically illustrates a base station according to an embodiment of the invention.

FIG. 6 schematically illustrates exemplary structures for implementing the above-described concepts in the BS 100.

In the illustrated structure, the BS 100 includes a radio interface 130 for sending transmissions to one or more terminal devices, e.g., the terminal devices 200, 210, and/or for receiving transmissions from these terminal devices. It is to be understood that for implementing transmitter (TX) functionalities the radio interface 130 will include one or more transmitters 134, and that for implementing receiver (RX) functionalities the radio interface 130 will include one or more receivers 132. In the above-mentioned LTE scenario, the radio interface 130 may correspond to the Uu interface. Further, the BS 100 may include a control interface 140 for communicating with other nodes of the mobile network, e.g., the control node 300 of FIG. 1.

Further, the BS 100 includes a processor 150 coupled to the interfaces 130, 140 and a memory 160 coupled to the processor 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the BS 100. More specifically, the memory 160 may include a signal processing module 170 for accomplishing processing signals for transmission of a data block, e.g., for performing decoding of incoming transmissions or encoding of outgoing transmissions. However, it is to be understood that signal processing may at least in part also be accomplished by dedicated hardware, e.g., in the form of one or more signal processor. Further, the memory 160 may include a collision detection module 180 for detecting potential collisions of feedback messages from one or more terminal devices. Further, the memory 160 may include a transmission control module 190 controlling transmissions of data blocks to or from a terminal device. As mentioned above, this control may in particular include scheduling transmissions of downlink data blocks and controlling the transmission of corresponding feedback messages. This in turn may be accomplished taking into account potential feedback collisions between feedback messages.

It is to be understood that the structure as illustrated in FIG. 6 is merely schematic and that the BS 100 may actually include further components which, for the sake of clarity, have not been illustrated, e.g., further interfaces or additional processors. Also, it is to be understood that the memory 160 may include further types of program code modules, which have not been illustrated. For example, the memory 160 may include program code modules for implementing typical functionalities of a BS. According to some implementations, also a computer program product may be provided for implementing functionalities of the BS 100, e.g., a computer-readable medium storing the program code and/or other data to be stored in the memory 160.

Figure 7:
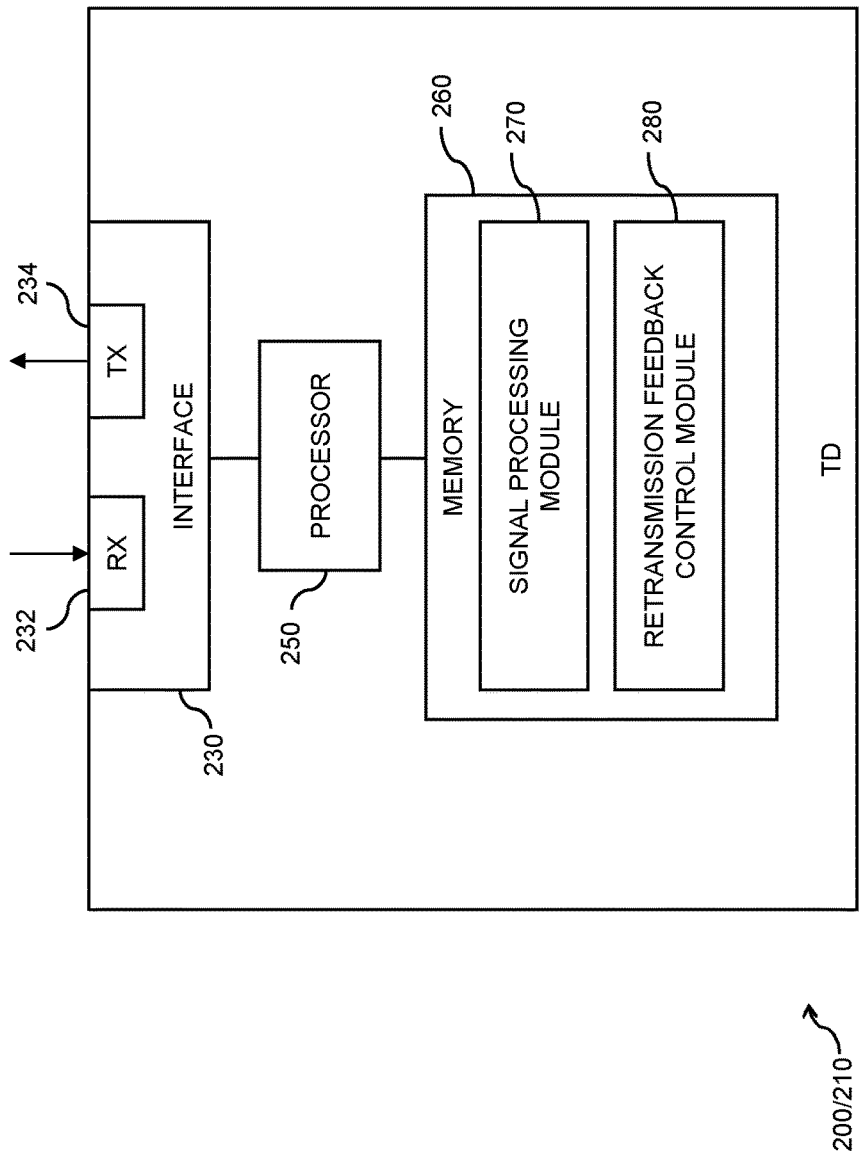
FIG. 7 schematically illustrates a terminal device according to an embodiment of the invention.

FIG. 7 schematically illustrates exemplary structures for implementing the above-described concepts in the terminal device 200/210.

In the illustrated structure, the terminal device 200/210 includes a radio interface 230 for performing transmissions to or from a BS of a mobile network, e.g., the BS 100. It is to be understood that for implementing transmitter (TX) functionalities the radio interface 230 will include one or more transmitters 234, and that for implementing receiver (RX) functionalities the radio interface 230 will include one or more receivers 232. In the above-mentioned LTE scenario, the radio interface 230 may correspond to the Uu interface.

Further, the terminal device 200/210 includes a processor 250 coupled to the radio interface 230 and a memory 260 coupled to the processor 250. The memory 260 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 260 includes suitably configured program code to be executed by the processor 250 so as to implement the above-described functionalities of the terminal device 200/200'. More specifically, the memory 260 may also include a signal processing module 270, e.g., for performing decoding of incoming transmissions or encoding of outgoing transmissions. However, it is to be understood that signal processing may at least in part also be accomplished by dedicated hardware, e.g., in the form of one or more signal processors. Further, the memory 260 may include a retransmission feedback control module 280 for controlling the sending of feedback messages of the retransmission protocol on resources as indicated by control data received from the BS.

It is to be understood that the structure as illustrated in FIG. 7 is merely schematic and that the terminal device 200/210 may actually include further components which, for the sake of clarity, have not been illustrated, e.g., further interfaces or additional processors. Also, it is to be understood that the memory 260 may include further types of program code modules, which have not been illustrated. For example, the memory 260 may include program code modules for implementing typical functionalities of a terminal device. According to some implementations, also a computer program product may be provided for implementing functionalities of the terminal device 200/210, e.g., a computer-readable medium storing the program code and/or other data to be stored in the memory 260.

Figure 8:
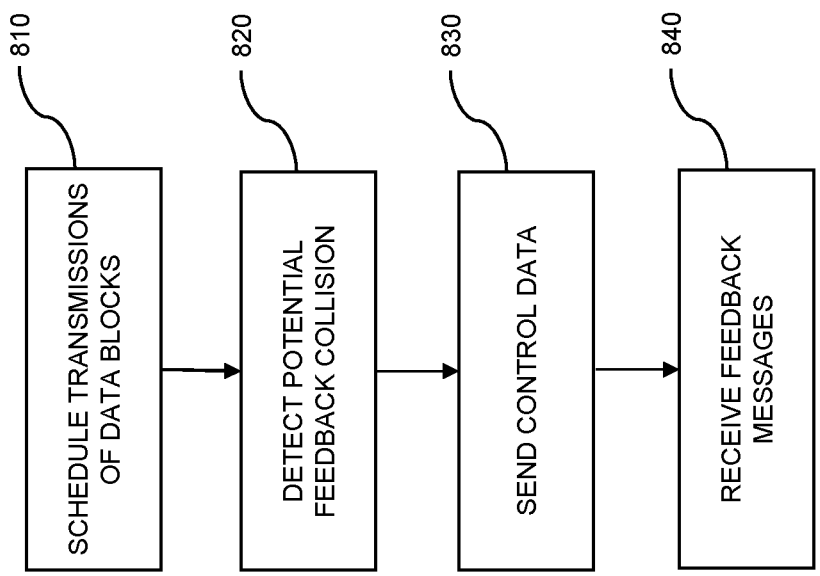
FIG. 8 shows a flowchart for illustrating a method according to an embodiment of the invention.

FIG. 8 shows a flowchart for schematically illustrating a method which may be used to implement the above-described concepts in a BS of a mobile network, e.g., in the above-mentioned BS 100.

At step 810, the BS may schedule transmissions of downlink data blocks to at least one terminal device, e.g., the above-mentioned terminal device 200 and/or the terminal device 210. The data blocks may be transmitted to the same terminal device or to different terminal devices. The data blocks may also have different sizes. The scheduling may involve assigning a resource block of a downlink data channel to be used for transmission of a first data block and assigning a resource block of a downlink data channel to be used for transmission of a second data block. The downlink data channel may for example be the above-mentioned downlink data channel 21, e.g., a PDSCH. The transmission of data blocks is accomplished on the basis of a retransmission protocol, e.g., a HARQ protocol. In accordance with the retransmission protocol, a first feedback message corresponding to the first data block is transmitted, e.g., the first feedback message 308 of FIG. 3 or the first feedback message 408 of FIG. 4, and a second feedback message corresponding to the second data block is transmitted, e.g., the second feedback message 309 of FIG. 3 or the second feedback message 409 of FIG. 4. The first feedback message indicates whether the first data block was successfully received, and the second feedback message indicates whether the second data block was successfully received. The first feedback message and the second feedback message may originate from different terminal devices, e.g., as in the scenario of FIG. 3, or may originate from the same terminal device, e.g., as in the scenario of FIG. 4. The first and second feedback messages may be feedback messages of a HARQ protocol, e.g., a HARQ ACK or a HARQ NACK. Further, the first feedback message corresponds to a first feedback time between transmission of the first data block and transmission of the first feedback message, and the second feedback message corresponds to a second feedback time between transmission of the second data block and transmission of the second feedback message. The first feedback time and the second feedback time are different.

At step 820, the BS may detect a potential collision between the first feedback message and the second feedback message. For this purpose, the BS may determine that transmission of the first feedback message is expected on the same resources of an uplink control channel as the second feedback message.

At step 830, the BS controls the terminal device to send the second feedback message on other resources than used for sending the first feedback message. For this purpose the BS may control the terminal device to send the second feedback message on resources of the uplink control channel which are different from resources of the uplink control channel used for sending the first feedback message. The BS may also control the terminal device to send the second feedback message on an uplink data channel. Further, the BS may control the terminal device to send the second feedback message in a resource area of the uplink control channel which is orthogonal to a further resource area of the control channel which is used for transmission of the first feedback message. The resource area may be assigned to the terminal device on the basis of a device category of the terminal device, e.g., if terminal devices of a certain device category always use the same feedback time. For example, a device category of low-performance UEs could be defined to use a certain feedback time, and a resource area of the uplink control channel could be assigned to this device category.

The control operations of step 830 may in turn involve that the BS sends control data to the terminal device. The control data may be sent in response to detecting a potential feedback collision at step 830, i.e., apply to a specific feedback message for which a collision is expected. However, the control data may also apply to multiple feedback messages to be sent from the terminal device, e.g., to feedback messages corresponding to a certain feedback time, e.g., if the control data defines a resource area of the uplink control channel which is assigned to this feedback time. In the latter case, the control data may be sent before scheduling transmission of the first data block and the second data block at step 810.

At step 840, the BS may receive the first feedback message and the second feedback message which are transmitted on different resources as determined through the control operation of step 830.

Figure 9:
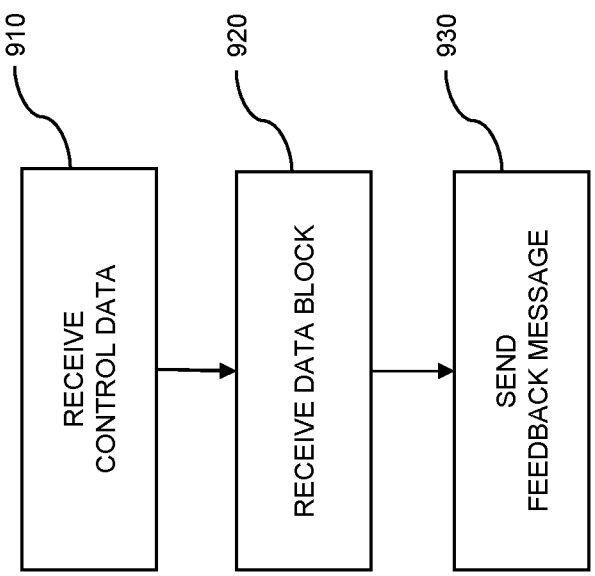
FIG. 9 shows a flowchart for illustrating a further method according to an embodiment of the invention.

FIG. 9 shows a flowchart for schematically illustrating a method which may be used to implement the above-described concepts in a terminal device, e.g., in the above-mentioned terminal device 200 or 210.

The terminal device generally performs transmissions of data blocks with respect to a mobile network. The transmission of data blocks is accomplished on the basis of a retransmission protocol, e.g., a HARQ protocol. The retransmission protocol supports at least a first feedback time and a second feedback time which is different from the first feedback time. The first feedback time is a time interval between transmission of a first data block and transmission of a first feedback message indicating whether the first data block was successfully received. The second feedback time is a time interval between transmission of a second data block and transmission of a second feedback message indicating whether the second data block was successfully received. The first and second feedback messages may for example be a HARQ ACK or a HARQ NACK. The first feedback message may for example correspond to the first feedback message 308 of FIG. 3 or to the first feedback message 408 of FIG. 4. The second feedback message may for example correspond to the second feedback message 309 of FIG. 3 or to the second feedback message 409 of FIG. 4. Accordingly, the first feedback message and the second feedback message may originate from different terminal devices, e.g., as in the scenario of FIG. 3, or may originate from the same terminal device, e.g., as in the scenario of FIG. 4. The data blocks may also have different sizes. In the following, it will be assumed that the terminal device implementing the method of FIG. 9 at least receives the second data block and sends the second feedback message. The terminal device may also receive the first data block and send the first feedback message, as in the scenario of FIG. 4. However, the reception of the first data block and sending of the first feedback message could also be performed by another terminal device.

At step 910, the terminal device receives control data from a base station of the mobile network, e.g., the BS 100. The control data may include scheduling information for the transmission of the second data block, e.g., in the form of a downlink assignment. For example, the scheduling information may indicate a resource block of a downlink data channel to be used for transmission of the second data block. The downlink data channel may for example be the above-mentioned downlink data channel 21, e.g., a PDSCH. In some scenarios, the control data may additionally indicate a resource of an uplink control channel to be used for sending the second feedback message or a resource block of an uplink data channel to be used for sending the second feedback message. In some scenarios, the control data may indicate a resource area of an uplink control channel to be used for transmission of the second feedback message. In such cases, the control data may also be sent independently from the scheduling information and may apply to multiple feedback messages to be sent from the terminal device, e.g., to feedback messages corresponding to a certain feedback time.

As illustrated by step 920, the terminal device may then receive the second data block. Depending on whether the second data block was successfully received, e.g., successfully decoded, the terminal device may generate the second feedback message, e.g., as a HARQ ACK or as a HARQ NACK.

At step 930, the terminal device sends the second feedback message. In accordance with the control data received at step 910, the terminal device sends the second feedback message on other resources than used for sending the first feedback message. For example, the control data may cause the terminal device to send the second feedback message on resources of the uplink control channel which are different from resources of the uplink control channel used for sending the first feedback message. More specifically, the control data may cause the terminal device to send the second feedback message on resources of the uplink control channel as indicated in the control data. The control data may also cause the terminal device to send the second feedback message on the uplink data channel, e.g., on a resource block of the uplink data channel indicated by the control data. Further, the control data may cause the terminal device to send the second feedback message in a resource area of the uplink control channel which is orthogonal to a further resource area of the control channel which is used for transmission of the first feedback message. For this purpose, the control data may indicate the resource area to be used for sending the second feedback message. The resource area may be assigned to the terminal device on the basis of a device category of the terminal device, e.g., if terminal devices of a certain device category always use the same feedback time. For example, a device category of low-performance UEs could be defined to use a certain feedback time, and a resource area of the uplink control channel could be assigned to this device category.

As can be seen, by using the above described concepts different processing capabilities of terminal devices can be efficiently supported in the mobile network by allowing different feedback times. In this way, a mobile network designed for large bandwidth and/or high throughput, such as an LTE mobile network, can also accommodate low-performance terminal devices, such as MTC terminal devices. Further, a low-power mode of terminal devices can be supported in an efficient manner. Collisions between feedback messages corresponding to different feedback times can be avoided.

It is to be understood that the examples and embodiments as explained above are merely illustrative and susceptible to various modifications. For example, the concepts could be used in types of mobile network which differ from the above-mentioned example of an LTE mobile network. Also, the concepts could be used to avoid collisions between more than two feedback messages. Further, it is to be understood that the above concepts may be implemented by using correspondingly designed software in existing mobile network nodes or terminal devices, or by using dedicated hardware of such mobile network nodes or terminal devices.

The invention claimed is:

1. A method of controlling transmission of data blocks between a mobile network and at least one terminal device, the method comprising:
   determining, by a base station of the mobile network, that a first feedback time associated with a first terminal device and a second feedback time associated with a second terminal device are different, wherein the first feedback time defines a time interval between transmission of a first data block to the first terminal device and transmission of a first feedback message indicating whether the first data block was successfully received, and the second feedback time defines a time interval between transmission of a second data block to the second terminal device and transmission of a second feedback message indicating whether the second data block was successfully received;
   detecting whether a potential collision between the first feedback message and the second feedback message is expected; and
   in response to the determination and when it is detected that the potential collision is expected, sending control data via radio resource control signaling from the base station of the mobile network to the second terminal device, the control data indicating to the second terminal device resources for sending the second feedback message on an uplink channel, wherein the control data comprises an offset from an index of a starting control channel element of a downlink control channel used for sending a downlink assignment to the second terminal device.

2. The method of claim 1, wherein the control data indicates to send the second feedback message on resources of an uplink control channel which are different from resources of the uplink control channel used for sending the first feedback message.

3. The method of claim 1, wherein the control data indicates to send the second feedback message in a resource area of an uplink control channel assigned to the second feedback time, the resource area being orthogonal to a further resource area of the uplink control channel which is assigned to the first feedback time.

4. The method of claim 3, wherein the resource area and the further resource area are separated from each other in at least one of:
   the time domain;
   the frequency domain; and
   the code domain.

5. The method of claim 3, wherein the resource area of the uplink control channel is assigned to the terminal device based on a device category of the terminal device.

6. The method of claim 1, wherein the method comprises assigning by the base station a downlink control channel element for sending the control data relating to the transmission of the second data block that differs from a downlink control channel element for sending control data related to the transmission of the first data block.

7. The method of claim 1, wherein the control data explicitly indicates an assignment of an uplink control channel resource for transmission of the second feedback message.

8. The method of claim 1, wherein the control data indicates to the second terminal device to switch to sending the second feedback message on an uplink data channel from an uplink control channel to avoid a collision with resources for sending the first feedback message on the uplink control channel.

9. The method of claim 1, wherein the first feedback time and the second feedback time are each based on a retransmission protocol that is a Hybrid Automatic Repeat Request (HARQ) protocol.

10. The method of claim 1, wherein the method comprises the base station delaying transmission of the second data block to the terminal device in response to detecting the potential collision.

11. The method of claim 1, wherein the method further comprises determining the size of the second data block, and the sending of the control data is based on the size of the second data block.

12. The method of claim 1, wherein the method comprises the base station determining that the first feedback time is different from the second feedback time based on uplink control data received from the first terminal device or second terminal device.

13. The method of claim 12, wherein the uplink control data indicates a capability of the terminal device, and the method comprises the base station mapping the capability to a particular feedback time.

14. The method of claim 1, wherein the first feedback time is larger than the second feedback time based on differences in the processing capabilities of the first terminal device and the second terminal device.

15. The method of claim 1, wherein the control data indicates to the second terminal devices resources for sending the second feedback message that differ in the time domain from resources for sending the first feedback message.

16. The method of claim 1, wherein the method comprises in response to the determination and when it is detected that the potential collision is not expected, refraining from submitting any offset from the index of the starting control channel element of the downlink control channel.

17. A method of controlling transmission between a mobile network and a second terminal device, the method comprising:
   responsive to a base station detecting a potential collision between a first feedback message and a second feedback message is expected, the second terminal device receiving control data via radio resource control signaling from a base station of the mobile network, the control data indicating to the second terminal device resources for sending the second feedback message on an uplink channel, wherein the control data comprises an offset from an index of a starting control channel element of a downlink control channel used for sending a downlink assignment to the second terminal device;
   in accordance with the received control data, the second terminal device sending the second feedback message on the indicated resources; and
   wherein a first feedback time is associated with a first terminal device and defines a time interval between transmission of a first data block and transmission of the first feedback message indicating whether the first data block was successfully received;
   wherein a second feedback time is associated with the second terminal device and defines a time interval between transmission of a second data block and transmission of the second feedback message indicating whether the second data block was successfully received; and wherein the first feedback time is different from the second feedback time.

18. The method of claim 17, wherein the terminal device sends the second feedback message in a resource area of an uplink control channel assigned to the second feedback time, the resource area being orthogonal to a further resource area of the uplink control channel which is assigned to the first feedback time.

19. The method of claim 18, wherein the resource area and the further resource area are separated from each other in at least one of:
the time domain;
the frequency domain; and
the code domain.

20. The method of claim 18, wherein the resource area of the uplink control channel is assigned to the second terminal device based on a device category of the second terminal device.

21. The method of claim 17, wherein the control data explicitly indicates an assignment of an uplink control channel resource for transmission of the second feedback message.

22. The method of claim 17, wherein the control data indicates an assignment of an uplink data channel resource for transmission of the second feedback message on a data channel.

23. The method of claim 17, wherein the first feedback time and the second feedback time are each based on a retransmission protocol that is a Hybrid Automatic Repeat Request (HARQ) protocol.

24. A base station for use in a mobile network, the base station comprising:
a radio interface for transmission of data blocks with respect to at least one terminal device; and
a processing circuit, wherein the processing circuit is configured to:
determine that a first feedback time associated with a first terminal device and a second feedback time associated with a second terminal device is different, wherein the first feedback time defines a time interval between transmission of a first data block and transmission of a first feedback message indicating whether the first data block was successfully received, the second feedback time defining a time interval between transmission of a second data block and transmission of a second feedback message indicating whether the second data block was successfully received;
detect whether a potential collision between the first feedback message and the second feedback message is expected; and
in response to the determination and when it is detected that the potential collision is expected, sending control data via radio resource control signaling, the control data indicating to the second terminal device resources to send the second feedback message on an uplink channel, wherein the control data comprises an offset from an index of a starting control channel element of a downlink control channel used for sending a downlink assignment to the second terminal device.

25. A terminal device, comprising:
a radio interface for transmission of data blocks with respect to a mobile network;
a processing circuit, wherein the processing circuit is configured to:
responsive to a base station detecting a potential collision between a first feedback message and a second feedback message is expected, receive control data via radio resource control signaling from a base station of the mobile network, the control data indicating to the terminal device resources for sending the second feedback message on an uplink channel, wherein the control data comprises an offset from an index of a starting control channel element of a downlink control channel used for sending a downlink assignment to the second terminal device;
in accordance with the received control data, control the terminal device to send the second feedback message on the indicated resources; and
wherein the second feedback time is associated with the terminal device and defines a time interval between transmission of a second data block and transmission of the second feedback message indicating whether the second data block was successfully received;
wherein a first feedback time is associated with another terminal device and defines a time interval between transmission of a first data block and transmission of the first feedback message indicating whether the first data block was successfully received; and
wherein the first feedback time is different from the second feedback time.

26. A computer program product stored in a non-transitory computer readable medium for controlling transmission of data blocks between a mobile network and at least one terminal device, the computer program product comprising software instructions which, when run on a processing circuit of a base station of the mobile network, causes the base station to:
determine that a first feedback time associated with the first terminal device and a second feedback time associated with the second terminal device is different, wherein the first feedback time defines a time interval between transmission of a first data block and transmission of a first feedback message indicating whether the first data block was successfully received, and the second feedback time defines a time interval between transmission of a second data block and transmission of a second feedback message indicating whether the second data block was successfully received;
detect whether a potential collision between the first feedback message and the second feedback message is expected; and
in response to the determination and when it is detected that the potential collision is expected, send control data via radio resource control signaling from the base station of the mobile network to the second terminal device, the control data indicating to the second terminal device resources for sending the second feedback message on an uplink channel, wherein the control data comprises an offset from an index of a starting control channel element of a downlink control channel used for sending a downlink assignment to the second terminal device.

27. A computer program product stored in a non-transitory computer readable medium for controlling transmission of data blocks between a mobile network and at least one terminal device, the computer program product comprising software instructions which, when run on a processing circuit the terminal device, causes the second terminal device to:
responsive to a base station detecting a potential collision between a first feedback message and a second feedback message is expected, receive control data via radio resource control signaling from a base station of the mobile network, the control data indicating to the second terminal device resources for sending the second feedback message on an uplink channel, wherein the control data comprises an offset from an index of a starting control channel element of a downlink control channel used for sending a downlink assignment to the second terminal device;

in accordance with the received control data, send the second feedback message on the indicated resources; and wherein a first feedback time is associated with a first terminal device and defines a time interval between transmission of a first data block and transmission of the first feedback message indicating whether the first data block was successfully received;

wherein a second feedback time is associated with the second terminal device and defines a time interval between transmission of a second data block and transmission of the second feedback message indicating whether the second data block was successfully received; and wherein the first feedback time is different from the second feedback time.

* * * * *